INVENTOR.
ZBIGNIEW WIENCEK
BY Schroeder, Hofgren, Brady & Wegner
Att'ys.

INVENTOR.
ZBIGNIEW WIENCEK
BY Schroeder, Hofgren, Brady & Wagner
Attys.

INVENTOR.
ZBIGNIEW WIENCEK
BY Schraeder, Hofgren, Brady & Wegner
Attys.

Sept. 8, 1964 Z. WIENCEK 3,148,243

SYNCHRONIZATION OF SUBCARRIER OSCILLATOR WITH R-Y SYNCHRONOUS DETECTOR OUTPUT

Filed Aug. 8, 1958 5 Sheets-Sheet 4

INVENTOR.
ZBIGNIEW WIENCEK
BY Schroeder, Hofgren, Brady & Wegner
Attys.

Sept. 8, 1964

Z. WIENCEK 3,148,243

SYNCHRONIZATION OF SUBCARRIER OSCILLATOR WITH R-Y SYNCHRONOUS DETECTOR OUTPUT

Filed Aug. 8, 1958

5 Sheets-Sheet 5

INVENTOR.

ZBIGNIEW WIENCEK

BY Schroeder, Hofgren, Brady & Wegner

Att'ys.

United States Patent Office 3,148,243

Patented Sept. 8, 1964

3,148,243

SYNCHRONIZATION OF SUBCARRIER OSCILLATOR WITH R-Y SYNCHRONOUS DETECTOR OUTPUT

Zbigniew Wiencek, Arlington Heights, Ill., assignor to Warwick Electronics Inc., a corporation of Delaware Filed Aug. 8, 1958, Ser. No. 753,927
4 Claims. (Cl. 178—5.4)

This invention relates to novel circuitry and methods particularly adapted for color television reception.

The standard color television signal used for transmission in the United States includes, in addition to horizontal and vertical synchronizing and brightness information as in black and white television, chrominance or "chroma" information modulated on a subcarrier of approximately 3.58 megacycles, with the subcarrier suppressed. A short burst of 3.58 megacycle synchronizing information is provided, immediately following the horizontal synchronizing pulse in the time sequence of the signal. Most color television receivers utilize synchronous detectors to demodulate the chroma information, and include a local oscillator synchronized with the 3.58 megacycle synchronizing signal to effect the demodulation.

It is essential to the reproduction of the hue of the picture that the oscillator be accurately synchronized with the synchronizing signal, with respect to both phase and frequency. The amplitude of the chroma information determines the "saturation" of the picture, i.e. whether colors are vivid or pale, and it is necessary that the amplitude of the signals applied to the kinescope be properly regulated to reproduce the televised scene accurately.

One object of the invention is the provision of an improved circuit for maintaining the local oscillator accurately synchronized with respect to both phase and frequency of the synchronizing information.

Another object is the provision of an improved chroma gain control circuit.

A further object is the provision of circuitry which utilizes the amplitude of the synchronizing signal appearing in the output of a synchronous detector for controlling a characteristic of the oscillator control circuit. The purpose of this circuitry is to provide an oscillatory system with a wide pull-in range when the oscillator is out of synchronism with the transmitted synchronizing signal, and having a high degree of noise rejection and oscillator control accuracy when the oscillator is operating at or near synchronism.

Yet another object is to provide circuitry including synchronous detector means for deriving the synchronizing information from the signal, a local oscillator having an output connected to the detector means for synchronizing the operation thereof, and means responsive to the synchronizing signal information appearing in the output of the synchronous detector means for controlling operation of the local oscillator. Still a further object is to provide a synchronous detecting circuit in which the synchronizing information appearing in the output has a predetermined amplitude when the phase and frequency of the local oscillator are correct, together with means responsive to a deviation of the synchronizing information appearing in the output from the predetermined amplitude, for correcting the phase and frequency of the local oscillator.

Another object is to provide circuitry including amplifying means for the received signal, detector means for deriving the desired picture information from the signal, and means, connected to the output of the detector means, and responsive to the amplitude of the demodulated control information in the output, for controlling the gain of the amplifying means. Yet a further object is to provide circuitry in which the amplitude of the synchronizing signal appearing in the detector output is utilized to condition the receiver for color operation in the presence of such signal and for conditioning the receiver for black and white operation in the absence of the signal.

Another object is to provide circuitry including a synchronous detector for deriving the synchronizing and chroma information from the received signal, a local oscillator having an output connected to the detector for synchronizing the operation thereof, a circuit responsive to the synchronizing information in the signal for controlling operation of the oscillator and having a variable response characteristic, and means responsive to the amplitude of the synchronizing information in an output of the detector for controlling the variable response characteristic.

Further objects and advantages will become apparent from the following detailed description taken in connection with the accompanying drawings, in which.

Figure 1:
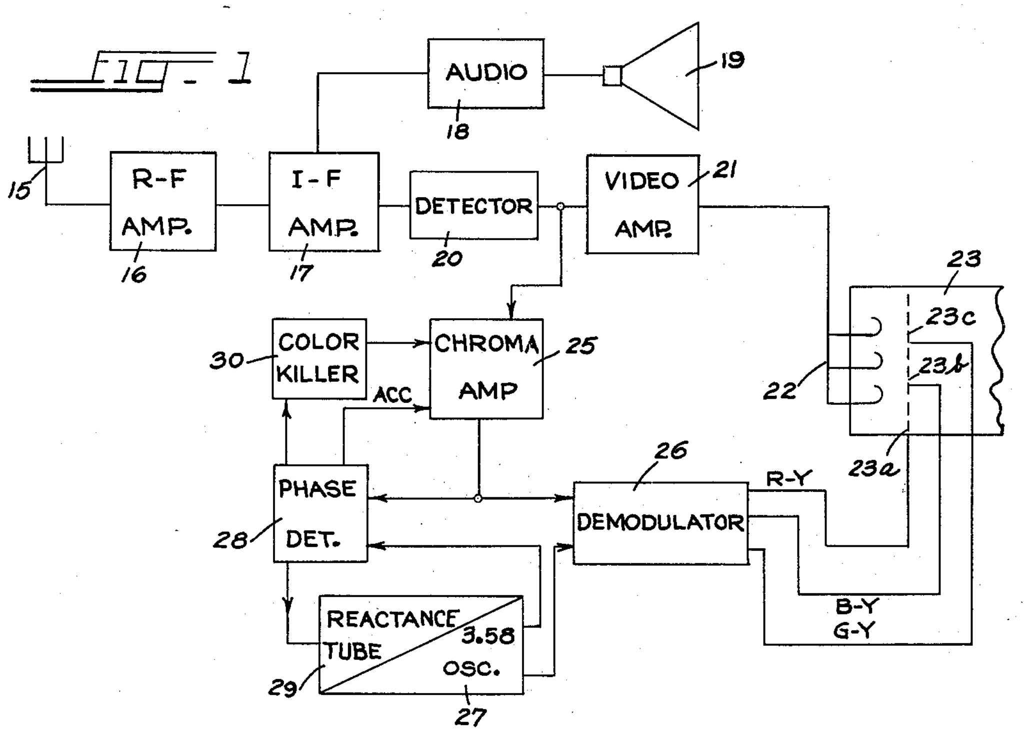
FIGURE 1 is a block diagram of a color television receiver.

While this invention is susceptible of embodiments in many different forms, there is shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

In FIGURE 1, one form of a basic color television receiver is illustrated in block form. A transmitted signal is received by antenna 15 and amplified in radio frequency and intermediate frequency amplifiers 16 and 17. The audio information is separated from the picture information of the signal, detected and amplified in suitable circuits 18, and coupled to the speaker 19. The amplified video intermediate frequency signal from intermediate frequency amplifier 17 is coupled to a video detector 20 which has two outputs. The first output represents the brightness of the picture and is coupled to a video amplifier 21 and to the cathodes 22 of tricolor kinescope 23. The amplitude of the signal applied to the cathodes determines the brightness of the image displayed on the screen, ranging from black to white. The second output derived from video detector 20 represents the color information for the signal including the phase and amplitude modulated information indicating hue and saturation, and the 3.58 megacycle synchronizing burst; and is connected to a chroma amplifier 25. The amplified chroma signal is connected to a synchronous demodulator or detector 26, which includes mixing or matrix circuits and has three outputs providing red (R–Y) information to control grid **23*a*, blue (B–Y) information to control grid 23*b*, and green (G–Y) information to control grid 23*c***.

A local oscillator 27, generally crystal controlled provides the 3.58 megacycle synchronizing signal for the synchronous detector 26. A portion of the output of the oscillator is coupled to a phase detector 28, to which is also fed a portion of the output of chroma amplifier 25. The phase detector compares the oscillator phase and frequency with the synchronizing signal information in the output of the chroma amplifier and provides a correction signal to reactance tube 29, to keep the oscillator properly synchronized with the synchronizing information from the incoming signal.

The phase detector has two additional functions. First, it provides an automatic chroma control signal in the form of a gain control signal to the chroma amplifier. Second, it controls a color killer 30 which renders the chroma amplifier 25 inoperative in the absence of the incoming color information, in which event the receiver functions as a black and white set with the picture produced by the brightness information applied to the cathodes 22 of the kinescope.

A serious problem in the basic circuit outlined above is found in the control of the local 3.58 megacycle oscillator. While the phase and frequency of the oscillator can be maintained accurately in synchronism with the synchronizing information in the output of the chroma amplifier 25, a certain amount of undesirable phase shifting often takes place in the demodulator circuitry, resulting in improper synchronization of the demodulator and incorrect reproduction of the hue of the picture. Furthermore, the automatic gain control circuit for the chroma amplifier is of insufficient accuracy to maintain the proper chroma amplitudes in the reproduced picture, without the use of a manual "chroma gain" control.

Figure 2:
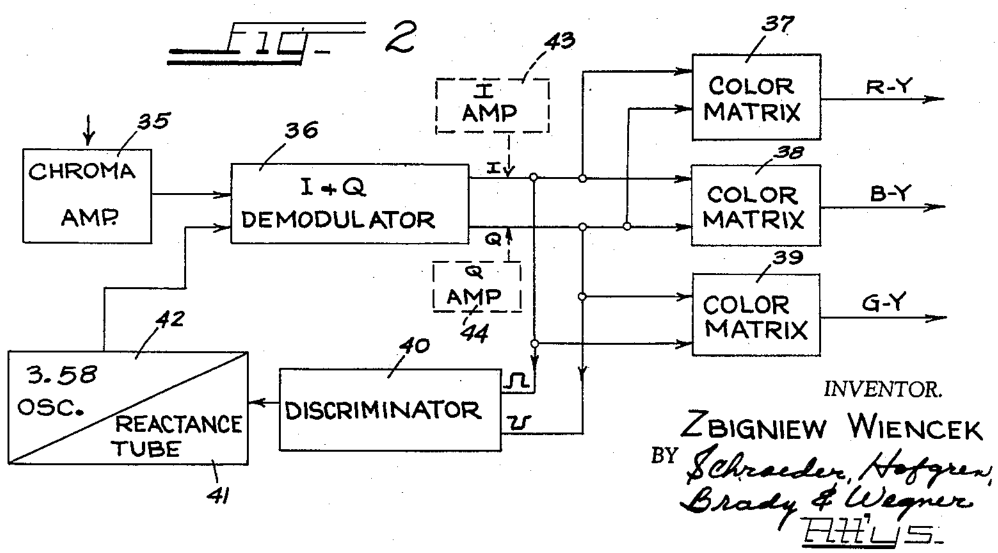
FIGURE 2 is a block diagram of an embodiment of the invention.

Turning now to FIGURE 2, a block diagram of an improved oscillator control circuit is illustrated. The picture information in the output of the chroma amplifier 35 is coupled to synchronous detector 36 which demodulates the chroma information along the I and Q axes. The resulting I and Q signals are combined in a suitable manner, as is known, by color matrices 37, 38 and 39 to provide the R–Y, B–Y and G–Y signals required for the kinescope operation.

Figures 8, 9:
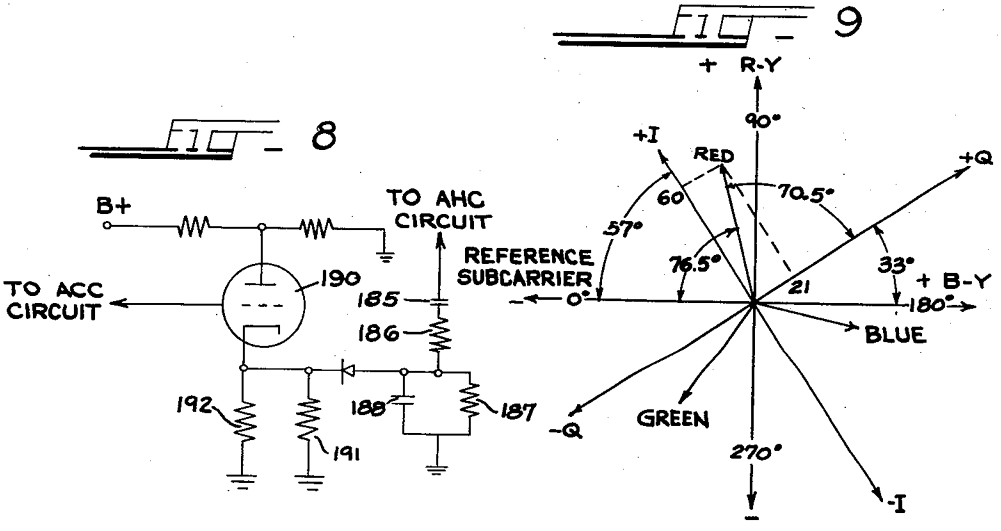
FIGURE 8 is a vector diagram illustrating the relationships of various signals and axes discussed herein.

Turning now to FIGURE 9, a vector diagram is given illustrating the relationships of the R–Y, B–Y, I and Q axes, the reference subcarrier and the basic colors. It will be noted that the reference subcarrier or burst, if resolved into its components along the I and Q axes, provides signals which are opposite in sign (positive along the I axis and negative along the Q axis) and substantially equal in amplitude.

In the circuit of FIGURE 2, these burst components are separated from the demodulator output and coupled to a discriminator 40. The difference voltage from the discriminator is utilized by reactance tube 41 to control the phase and frequency of the local oscillator 42. With the oscillator operating at the proper phase and frequency, there is a continuous negative voltage in the output of the discriminator, which may be compensated for by unbalancing the discriminator or by proper adjustment of the reactance tube. When the phase of the oscillations correspond with yellow (a mixture of red and green) the output of the discriminator is zero. With a phase shift of the burst toward red, the discriminator output will be positive, while a shift toward green gives a negative output. The reactance tube 41 and its associated circuit, in response to the discriminator output signal, vary the oscillator phase and frequency to keep the oscillator synchronized with the reference information of the received signal.

This system, which utilizes the synchronizing signal information appearing in the output of the demodulator or synchronous detector for controlling the operation of the local oscillator, avoids the problem outlined above by automatically compensating for phase shift of the local oscillator signal introduced during demodulation. Thus, the oscillator is accurately synchronized with the reference information in the received signal, and the hue of the reproduced picture is a true representation of the transmitted information.

In some cases it is desirable that the output of the synchronous detector means be amplified before it is applied to the kinescope. In this event, it is preferable that the burst information for the oscillator control discriminator be obtained from the output of the demodulation product amplifier, as indicated by the broken lined blocks 43 and 44 in FIGURE 2, compensating for phase shifts in the amplifier and insuring proper phase conditions at the grids of the kinescope. In the following discussion in both the specification and claims, when mention is made of securing synchronizing or control information from the output of the demodulator or synchronous detector, it will be understood that this may mean either from the actual demodulator output circuit, or from the output of amplifiers such as indicated at 43 and 44, or from the grids of the picture tube.

Figure 3:
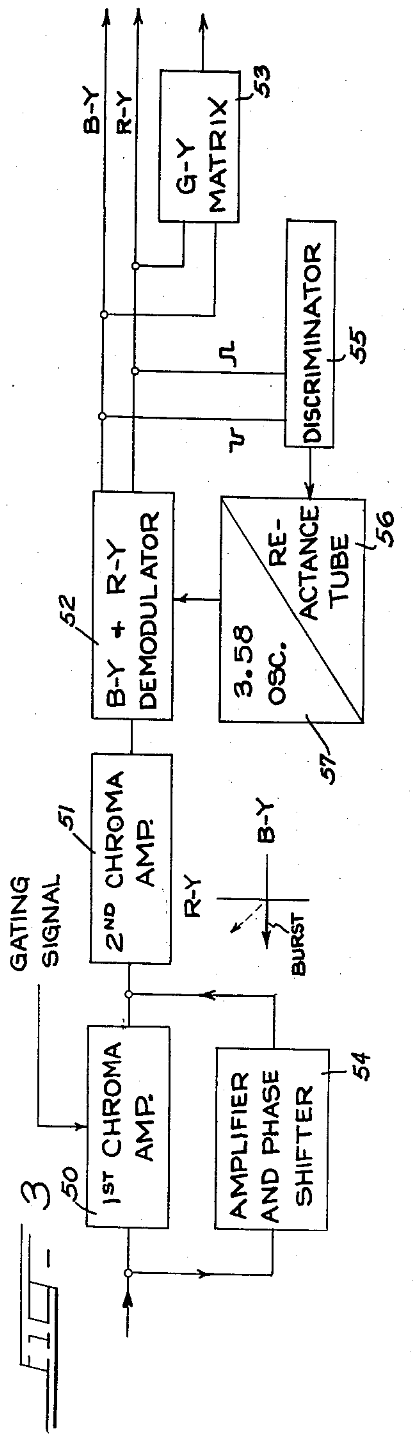
FIGURE 3 is a block diagram of a further embodiment of the invention.

FIGURE 3 illustrates a modified oscillator control circuit utilizing synchronous detectors which operate along the B–Y and R–Y axes (FIGURE 9). It will be noted that the synchronizing burst is 180° out of phase with the positive B–Y axis, and 90° displaced from the R–Y axis. With this phase relationship, the burst cannot be utilized to operate a practical discriminator circuit for controlling the oscillator. The circuit of FIGURE 3, however permits the use of the invention in a system incorporating B–Y and R–Y demodulation. The video signal from the video detector passes through first and second chroma amplifiers 50 and 51 to the B–Y and R–Y demodulator 52. The B–Y and R–Y signals appear in the modulator output, as indicated, and portions of these signals are combined in matrix 53 to provide the G–Y signal.

In accordance with the invention, a gating signal is applied to the first chroma amplifier 50 to separate out the reference burst which is passed through an amplifier and phase shifter 54, and is then recombined with the video signal in the input of the second chroma amplifier 51. The phase shifter portion of circuit 54 moves the burst with respect to the R–Y and B–Y axes in accordance with the small vector diagram accompanying FIGURE 3, from the solid line position to the broken line position, which is substantially at a 45° angle with respect to the axes. Thus, the burst information in the output of the synchronous detector or demodulator 52 is positive along the R–Y axis and negative along the B–Y axis, and when the oscillator is properly synchronized, the information is equal in amplitude. This burst information is coupled to discriminator 55, the output of which controls reactance tube 56 which in turn adjusts the phase and frequency of local oscillator 57.

Figure 4:
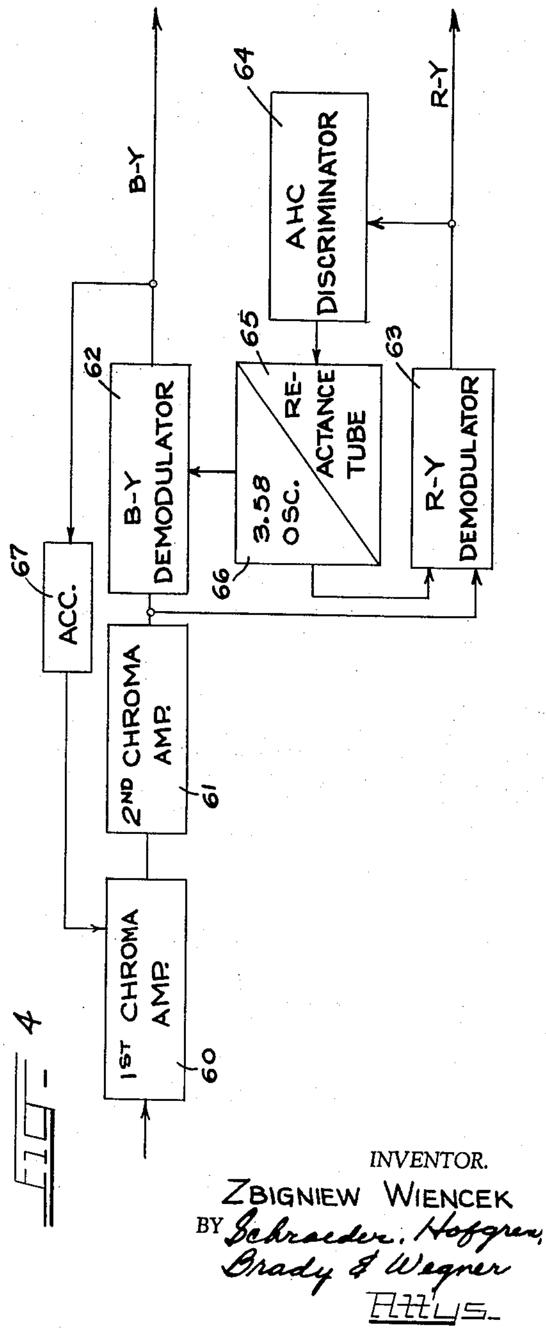
FIGURE 4 is a block diagram of a preferred embodiment of the invention.

FIGURE 4 illustrates a preferred embodiment of the invention in which the local oscillator is controlled by the absolute value of the synchronizing information appearing in the output of a single synchronous detector or demodulator. Again, the video information from the video detector is amplified by first and second chroma amplifiers 60 and 61. The output of the second chroma amplier is coupled to B–Y and R–Y synchronous detectors 62 and 63, respectively. Reference again to FIGURE 9 shows that the local oscillator synchronizing information or reference subcarrier has a quadrature relationship with the R–Y axis. Therefore, if the local oscillator is properly synchronized, no synchronizing information appears in the R–Y demodulator output. If the phase shifts toward red, the synchronizing information appears as a positive signal in the R–Y output, while if it shifts toward green the information appears as a negative signal. This positive and negative synchronizing information resulting from a phase or frequency error is utilized in an AHC (automatic hue control) discriminator 64 to control reactance tube 65, and thus the phase and frequency of local oscillator 66.

It has been mentioned above that the local oscillator synchronizing information or reference burst has a constant predetermined amplitude relative to the chroma information in the video signal from the transmitter. As shown in FIGURE 9, the reference burst is 180° out of phase with the B–Y signal, and accordingly, the synchronizing information appears as a negative voltage in the output of the B–Y demodulator. As the phase and frequency of the oscillator are maintained accurately in synchronism with the phase and frequency of the reference burst in the synchronous detector output by the AHC circuit, any variation in burst amplitude in the output of the B–Y demodulator is due solely to variations in the amplitude of the signal to the demodulator, as from variations in the received signal, or in the amplification of the various stages in the receiver. Accordingly, the burst information in the output of the B–Y demodulator is utilized in an ACC (automatic chroma control circuit) 67 to control the gain of the chroma amplifier. The control information is sufficiently accurate that a manual "chroma" control for the user of the receiver is rendered unnecessary, the saturation of the colors automatically being accurately reproduced.

Figure 5:
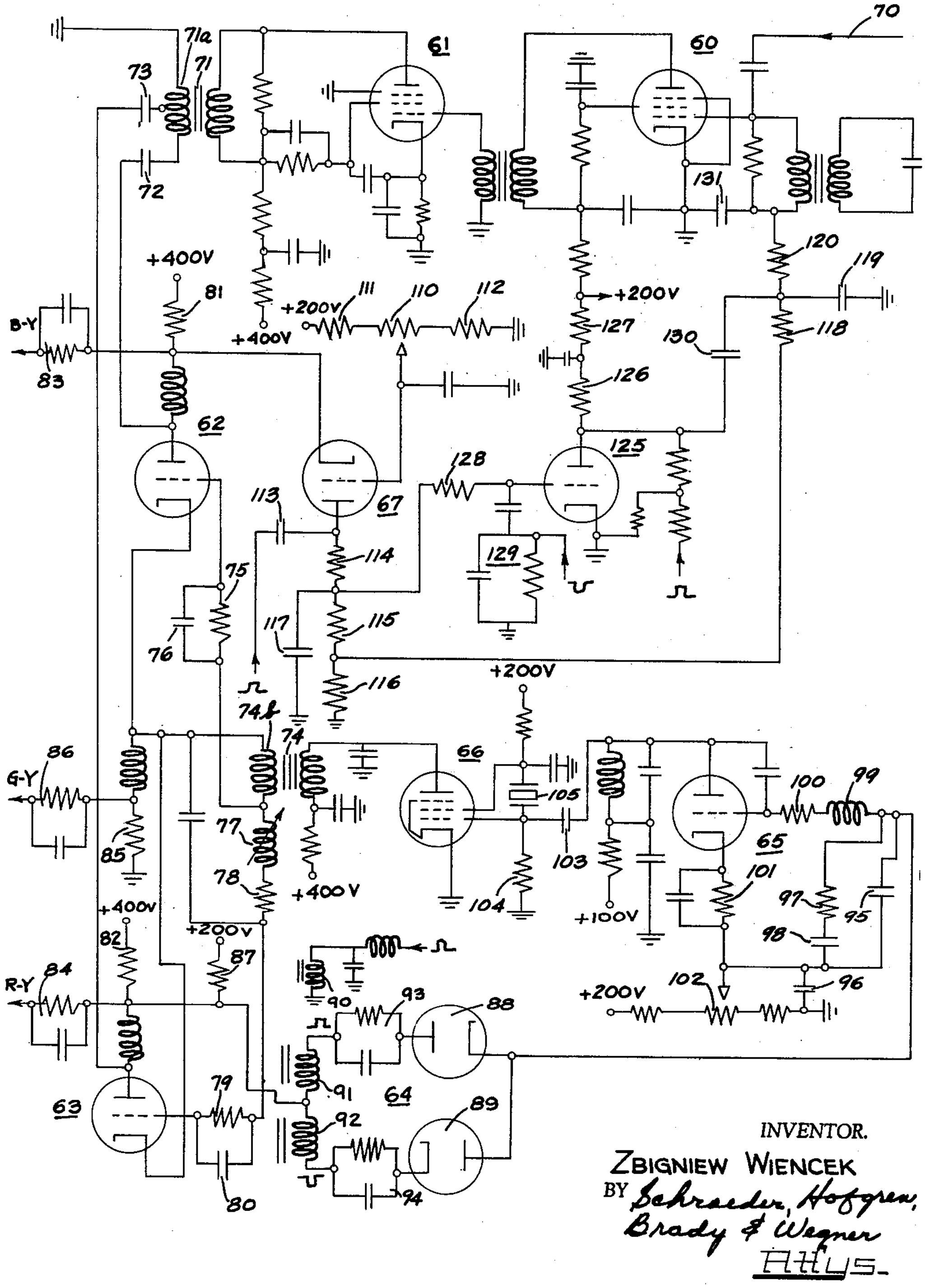
FIGURE 5 is a schematic diagram of the block diagram of FIGURE 4.

Referring now to FIGURE 5, a schematic diagram of the embodiment of the invention of FIGURE 4 will be described. Values for circuit elements and tube types for a typical operative circuit will be given. However, to avoid unnecessary detail only the values of components in those circuits which are particularly designed for operation in accordance with the invention will be given. In most cases, the B supply potential for the various stages is merely noted on the drawing. It is to be understood that this circuit is described in detail in order to disclose an operative embodiment of the invention and that many changes and modifications will be apparent to those skilled in the art.

The signal from the video detector is coupled through a blocking capacitor to the grid circuit of first chroma amplifier 60, one-half of a 6AN8. The output of first stage of amplification is transformer coupled to the control grid of second or output chroma amplifier, a 6CL6. The proper amplitudes of the chroma signal are obtained from a secondary winding 71*a* of the output transformer 71 and are coupled through blocking capacitors 72 and 73, each 27 μμf. (micromicrofarads), to the B–Y and R–Y synchronous detectors 62 and 63, respectively, each one-half of the 12BH7. The chroma signal is applied directly to the plate of each of the synchronous detectors, while the synchronizing signals from the local oscillator 66 are applied to the control grid thereof. The crystal controlled oscillator has an output transformer 74 connected in the plate circuit, within secondary winding 74*b* having one terminal returned to the cathodes of the synchronous detectors 62 and 63 which are connected together. The reference oscillation or synchronizing signal derived across the secondary winding is coupled through a circuit made up of a parallel combination of resistor 75, 10,000 ohms and capacitor 76, .02 μf., to the control grid of the B–Y detector 62. The synchronizing signal for the R–Y detector 63 is coupled through a phase shifting network including variable inductor 77 and resistor 78, and a biasing circuit including resistor 79, 10,000 ohms and capacitor 80, .06 μf., to the control grid of R–Y detector 63. The B–Y and R–Y chroma information is developed across plate load resistors 81, 39,000 ohms and 82, 16,000 ohms, of the B–Y and R–Y detectors, respectively. This information is coupled through identical circuits 83 and 84, each including a 100,000 ohms resistor in parallel with a .02 μf. capacitor, to the respective grids of the kinescope. The G–Y information is derived across a 6800 ohm resistor 85 in the common cathode circuit for demodulators 62 and 63, and is likewise coupled through a resistance-capacitance circuit 86 to the proper grid of the kinescope.

The anode circuit of R–Y detector 63 is connected to the juncture between resistors 82 and 87, 27,000 ohms, which together with the tube circuit form a voltage divider connected between the 400 volt and 200 volt B supplies, and the R–Y information for the kinescope is derived from this point. In addition, the synchronizing signal information fed to the AHC discriminator 64 is also obtained at this juncture point. The discriminator 64, in this embodiment of the invention, takes the form of a gated, bidirectional switch including a pair of diodes 88 and 89, the two halves of a 6AL5. The bidirectional switch is turned on or "gated" at the appropriate time by a pulse applied to the primary winding 90 of a coupling transformer, and derived from the horizontal fly-back pulse. The coupling transformer has two secondary windings 91 and 92 connected in series, with the burst information from the R–Y detector fed to the juncture between them. The secondary windings 91 and 92 are so phased that they render both of the reversely connected diode sections conductive during the pulse period, a positive pulse being applied to the anode of diode 98 and a negative pulse being applied to the cathode of diode 89. Interposed between the terminals of transformer windings 91 and 92 in the associated elements of the diodes are identical resistance-capacitance circuits 93 and 94, each including a 47,000 ohm resistor connected in parallel with a 0.2 μf. capacitor.

If the oscillator is properly phased with the synchronizing signal, there is no synchronizing signal appearing in the output of the R–Y demodulator 63 and there is no output from the discriminator 64, as the diodes conduct substantially equally. However, with a shift of the phase of the burst from quadrature relation with the R–Y axis, one or the other of the diodes will conduct more heavily providing an output which is utilized to control reactance tube 65. In this embodiment of the invention, a shift of the burst toward red provides a positive burst output in the R–Y detector, causing diode 88 to conduct more heavily; while a shift toward green provides a negative output causing diode 89 to conduct more heavily. The output from the discriminator, which appears at the connection between the cathode of diode 88 and the anode of diode 89, is integrated by a circuit including capacitor 95, 0.005 μf., connected between the discriminator output and ground through capacitor 96, 0.02 μf., and connected in parallel with the series combination of a resistor 97, 15,000 ohms, and capacitor 98, 0.2 μf. The integrated control potential is applied through choke 99 and resistor 100, 2200 ohms, to the control grid of the reactance tube 65, one-half of a 6U8. The cathode of the control tube is returned through a bypassed resistor 101 to the adjustable tap of a potentiometer 102 connected in a voltage divider between the 200 volt B supply and the ground, to adjust the nominal operating point of the tube. The reactance tube is connected through a capacitor 103, 200 μμf., with the control grid of the oscillator 66, the pentode section of the 6U8. The control grid is returned to ground through resistor 104, 100,000 ohms. A crystal 105, which nominally sets the operation of the oscillator at 3.58 megacycles, is connected between the control and screen grids, the screen grid acting as an anode for the oscillator section. The output of the local oscillator is derived from the plate circuit through coupling transformer 74, as previously described.

The chroma information from the B–Y demodulator 62 is coupled to the cathode of an automatic chroma control (ACC) gate tube 67, one-half of a 6AN8. The control grid of the gate tube is returned to the movable tap of a potentiometer 110, 4000 ohms, interposed between resistor 111, 400,000 ohms and resistor 112, 6500 ohms, connected across the 200 volt B supply, to adjust the operating level of the stage. A synchronizing or gate pulse is applied through blocking capacitor 113 to the plate of the gate tube which is in turn connected to ground through three series connected resistors, 114, 470,000 ohms, 115, 470,000 ohms and 116, 100,000 ohms. A capacitor 117, 0.2 μf., shunts resistors 115 and 116.

The gate pulse applied to the plate which is also derived from the fly-back pulse of the horizontal sweep circuit, coincides in time with the synchronizing information or reference burst of the chroma signal, and renders tube 67 conductive only during the occurrence thereof, preventing the chroma signal from affecting the ACC circuit. As pointed out above, the AHC circuits operate to maintain the phase of the synchronizing information burst in quadrature relation with the R–Y axis, and thus in phase, although negative in sign, with respect to the B–Y axis. Accordingly, any variation in amplitude of the reference burst in the output of the B–Y detector from a phase shift is eliminated, and such variation as is present is due entirely to changes in strength of the signal being received and in the amplification of the receiver. Accordingly, this information is used to provide an automatic gain control signal for the first chroma amplifier 60.

The control voltage is derived, in integrated form across resistor 116 and coupled through a circuit including series resistors 119, 100,000 ohms, shunt capacitor 119, 47 μμf., resistor 120, 3300 ohms, to the control grid circuit of chroma amplifier 60. As the synchronizing or burst signal at the transmitter is maintained at a constant amplitude, and the operation of the AHC and ACC circuits keeps its amplitude constant in the output of the B–Y demodulator, the chroma signals appearing in each of the three circuits B–Y, G–Y and R–Y, are an accurate representation of the transmitted chroma information so that the saturation of the colors is accurately reproduced by the kinescope, without the need for manual adjustment by the viewer. It is only necessary that the operating level of ACC gate tube 67 be properly set by adjusting resistor 110, either at the factory or by the serviceman.

The information from ACC gate tube 67 is also used to control the operation of the color killer 125, one-half of a 6AN8. The color killer is supplied with a positive gate pulse applied to the anode, which is also connected through resistors 126, 50,000 ohms and 127, 10,000 ohms, to a 200 volt B+ supply, and a negative gate pulse, applied to the control grid. The integrated burst or synchronizing information from the B–Y detector, developed across both resistors 115 and 116 is applied to the control grid of the color killer through resistor 128, 470,000 ohms. With a color signal being received, the negative potential across resistors 115 and 116 and applied to the control grid of the color killer tube 125 is sufficient to keep the tube cut off, in which event the first chroma amplifier 60 operates under the control of the ACC signal applied to the grid circuit. When a black and white signal is being received, the negative bias on the control grid of the color killer tube is reduced so that the tube conducts. With this operation, the negative gate signal applied through resistance-capacitance network 129 to the control grid appears in amplified form in the plate circuit as a positive pulse. The effect of this pulse is enhanced by the simultaneous appearance of the positive gate pulse applied to the plate. The resulting positive pulse, which is of substantial amplitude, is coupled through the capacitor 130, 0.01 μf., and resistor 120 to the control grid circuit of the first chroma amplifier. These positive pulses cause the grid to go positive, drawing grid current which charges capacitor 131, 100 μμf., cutting the chroma amplifier off.

Another problem of the automatic hue control circuit remains to be discussed. The stability necessary in the local subcarrier oscillator to provide accurate reproduction of the hues of the colors requires that the AHC circuit have a high degree of noise immunity and a high degree of accuracy. A simple circuit with these characteristics does not have a high "pull-in" range. That is, if the oscillator is operating at a frequency substantially removed from the frequency of the synchronizing signal, the circuit will not operate to correct the error and bring the oscillator to the correct frequency. Accordingly, many commercial circuits utilize a crystal controlled oscillator for the subcarrier generator, so that the oscillator will always be fairly close to the proper frequency, even in the absence of a synchronizing signal, and well within the pull-in range of the automatic control circuit.

Figure 6:
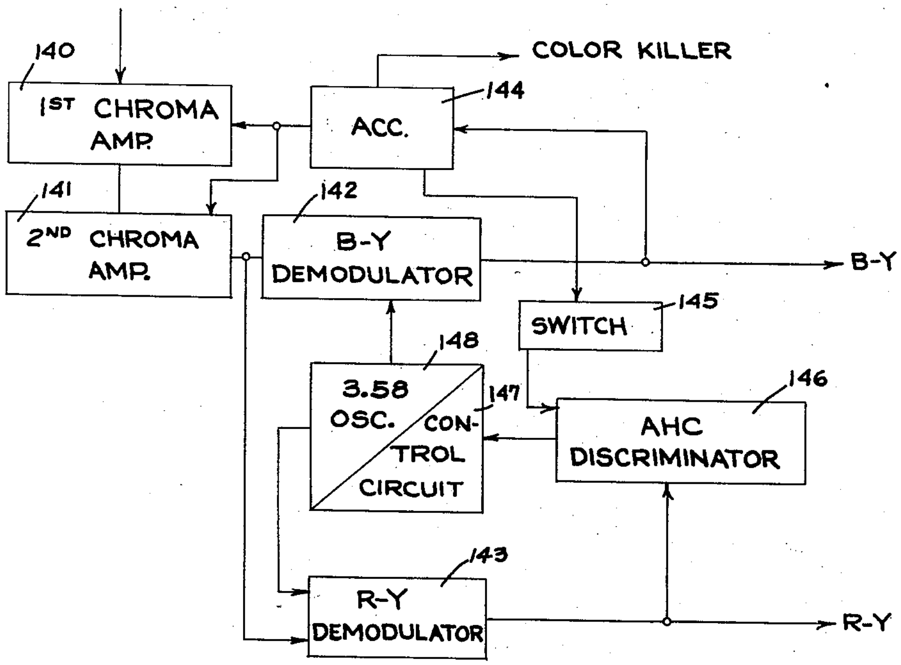
FIGURE 6 is a block diagram of another preferred embodiment of the invention.

FIGURE 6 shows in block form a circuit which utilizes an AHC circuit that has two modes of operation, one designed for its wide pull-in range characteristic, and the other for its noise immunity and accuracy. Signal information from the ACC circuit, which represents the amplitude of the color synchronizing signal appearing in the output of the B–Y demodulator, is utilized to select the proper mode of operation for the AHC circuit. Thus, when a color synchronizing signal is absent from or of low amplitude in the output of the B–Y demodulator, indicating that the oscillator is out of synchronism, the first mode of operation is used; and when the information from the ACC circuit has a relatively high amplitude, the second mode of operation is utilized.

As in the previous circuits, the output of the video detector is coupled to a first chroma amplifier 140, the output of which is further amplified by the second chroma amplifier 141. The amplified signal is detected in the synchronous B–Y and R–Y demodulators, 142 and 143, respectively. The B–Y output is fed through the automatic chrominance control or ACC circuit 144, providing control signals for a color killer, the first chroma amplifier and a switch 145 associated with the AHC discriminator 146. The AHC circuit is responsive to the R–Y output, modifying the control circuit 147 to synchronize the phase and frequency of local oscillator 148.

Figure 7:
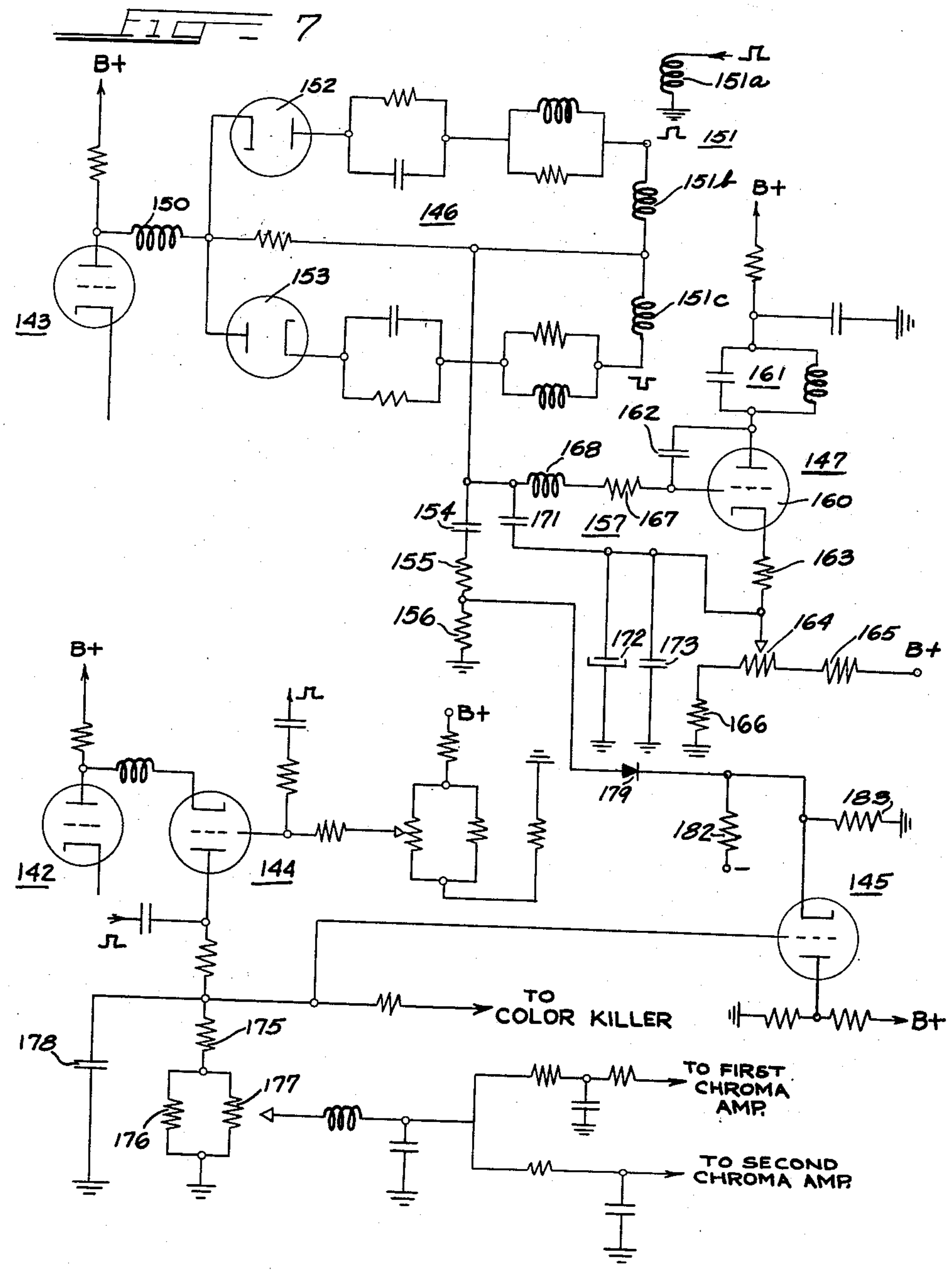
FIGURE 7 is a schematic diagram of a portion of the block diagram of FIGURE 6.

Turning now to FIGURE 7, a schematic circuit of an embodiment of the system of FIGURE 6 is shown. The circuit of FIGURE 7 shows only those elements which are important to the operation of the automatic control circuits, and certain portions of the circuitry which are fully disclosed in FIGURE 5 are not repeated here in the interests of simplicity.

The demodulated chroma information from the R-Y detector 143 is coupled through an RF choke 150 to a gated AHC discriminator circuit 146, which is provided with a gate pulse through transformer 151 having a primary winding 151*a* connected to a suitable point in the horizontal sweep circuit, and secondary windings 151*b* and 151*c*. The discriminator utilizes the two halves 152 and 153 of a dual diode, a 6AL5, and the output is obtained across the discriminator load including series connected capacitor 154, 0.2 μf., and resistors 155, 5600 ohms, and 156, 100,000 ohms. This signal corresponds with the AHC signal appearing at the juncture of the cathode of diode 88 and plate of diode 89 in FIGURE 5, and is connected with the control grid circuit 157 of reactance tube 147 associated with oscillator 148 (FIGURE 6). The discriminator load forms a resistance-capacitance filter connected in shunt with the grid circuit of control tube 147; and the time constant of this filter determines the control characteristic of the AHC or automatic hue control circuit.

The reactance tube 147 is a triode, as a 6U8, having a tuned inductance-capacitance circuit 161 connected between the anode and B+, and provided with a capacitor 162 connected between the plate and control grid to provide feedback. The cathode is returned through resistor 163, 1800 ohms, to the adjustable tap of a 1000 ohm potentiometer 164 in a voltage divider including resistor 165, 3300 ohms and resistor 166, 15,000 ohms, connected between B+ and ground, providing an adjustment for the operating condition of the circuit. The control circuit 157 includes resistor 167, 2200 ohms, connected in series with choke 168, 30 μh. (microhenries) to the control grid of the reactance tube, shunted by capacitor 171, 0.01 μf., and returned to ground through capacitors 172, 20 μf., and 173, 0.02 μf. The reactance tube 147 responds to variations in the control potential applied thereto to adjust the frequency and phase of oscillator 148 to maintain synchronism with the burst information from the incoming chroma signal.

Neglecting for the time being the effect of switch 145 on the filter circuit, the filter made up of capacitor 154 and resistors 155 and 156 has a relatively long time constant and the control circuit is relatively stable and immune to the effect of noise, the frequency and phase of the oscillator being controlled with a high degree of accuracy.

The ACC circuit of FIGURE 7 is generally the same as in FIGURE 5, the chroma information from the B–Y demodulator 142 being coupled to the cathode of ACC detector 144 which here has positive gating pulses applied to both the control grid and the plate, an integrated control signal appearing across the load network made up of resistor 175 connected in series with a parallel combination of resistor 176 and potentiometer 177, the entire resistive network being shunted by capacitor 178. Gain control signals for the chroma amplifiers are derived from potentiometer 177 as indicated in the drawing. The control grid of switch tube 145, one-half of a 6AN8, the cathode of which is connected through diode 179, 1N60, to the juncture between resistor 155 and resistor 156 in the AHC circuit filter, is connected directly to the ACC load. The cathode is also connected to the juncture of resistors 182, 10,000 ohms, and 183, 1000 ohms, connected from a negative voltage supply to ground, applying about one volt of negative bias thereto. When a color signal is being received, the switch tube 145 conducts, establishing a positive potential at the cathode and diode 179 is biased in the reverse direction and will not conduct. However, when the signal is not present, as is usually the case when first switching to color operation, and which may also happen during operation, the switch tube 145 is cut off, and diode 179 conducts, effectively shorting resistor 156 reducing the time constant of the filter and modifying the characteristics of reactance tube 147 and its associated control circuit 157 to increase the "pull-in" range of the oscillator 148.

I claim:

1. In a television receiver for receiving a signal containing synchronizing information and chroma information, circuitry comprising: a first synchronous detector for deriving R–Y information from such a signal; a second synchronous detector for deriving B–Y information from said signal; a local oscillator having outputs connected to said detectors for synchronizing the operation thereof; a circuit responsive to the synchronizing information in the output of the R–Y detector for controlling the phase and frequency of said oscillator, said circuit having a variable response characteristic; and means responsive to the amplitude of the synchronizing information in the output of the B–Y detector for controlling said variable response characteristic.

2. In a color television receiver for receiving a signal containing phase-related synchronizing information and chroma information, circuitry comprising: a display device having a chroma input; a synchronous detector for deriving chroma information from said signal, along the R–Y axis; means coupling said chroma information to the chroma input of said display device; a local oscillator having an output connected to said synchronous detector for synchronizing the operation thereof; an oscillator control circuit; and a bi-directional gated switch connected between the chroma input of said display device and oscillator control circuit for deriving the modulated synchronizing information from the input of said display device to control the phase and frequency of said oscillator, to maintain the amplitude of said synchronizing information appearing at said display device at zero.

3. In a color television receiver for receiving a signal containing phase-related synchronizing information and chroma information, circuitry comprising: a display device having a chroma input; a synchronous detector for deriving chroma information from said signal along the R–Y axis; means coupling said chroma information to the chroma input of said display device; a local oscillator having an output connected to said detector for synchronizing the operation thereof; an oscillator control circuit; and a bi-directional switch comprising reversely connected diodes with means gating said diodes to conduct during the occurrence of synchronizing information, said diodes being connected between the chroma input of said display device and said oscillator control circuit for applying synchronizing information from the display device input to the control circuit to vary the phase and frequency of said oscillator to maintain the amplitude of said synchronizing information appearing at said display device at zero.

4. The television circuitry of claim 3 wherein said television receiver includes a horizontal sweep circuit with a pulse output and means connecting a pulse from said sweep circuit to said gated bi-directional switch to cause said reversely connected diodes to conduct during the occurrence of said synchronizing information.

References Cited in the file of this patent

UNITED STATES PATENTS

| | | |
|---|---|---|
| 2,754,356 | Espenlaub | July 10, 1956 |
| 2,766,321 | Parker | Oct. 9, 1956 |
| 2,790,846 | Keizer | Apr. 30, 1957 |
| 2,798,900 | Bradley | July 9, 1957 |
| 2,841,642 | Richman | July 1, 1958 |
| 2,941,031 | Chandler | June 14, 1960 |
| 2,954,425 | Richman | Sept. 27, 1960 |
| 3,030,436 | Schroeder | Apr. 17, 1962 |

FOREIGN PATENTS

| | | |
|---|---|---|
| 712,738 | Great Britain | July 28, 1954 |